(12) United States Patent
Konishi

(10) Patent No.: US 9,715,604 B2
(45) Date of Patent: Jul. 25, 2017

(54) RFID TAG READING DEVICE, RFID TAG READING PROGRAM, AND RFID TAG READING METHOD

(71) Applicant: NEC Corporation, Minato-ku, Tokyo (JP)

(72) Inventor: Yusuke Konishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/889,903

(22) PCT Filed: Apr. 16, 2014

(86) PCT No.: PCT/JP2014/002151
§ 371 (c)(1),
(2) Date: Nov. 9, 2015

(87) PCT Pub. No.: WO2014/192216
PCT Pub. Date: Dec. 4, 2014

(65) Prior Publication Data
US 2016/0110569 A1 Apr. 21, 2016

(30) Foreign Application Priority Data
May 31, 2013 (JP) ................................ 2013-115940

(51) Int. Cl.
*H04Q 5/22* (2006.01)
*G06K 7/10* (2006.01)
*G06K 7/00* (2006.01)

(52) U.S. Cl.
CPC ....... *G06K 7/10019* (2013.01); *G06K 7/0008* (2013.01); *G06K 7/10029* (2013.01);
(Continued)

(58) Field of Classification Search
CPC .. G06K 7/10; G06K 7/10029; G06K 7/10069; G06K 7/10079; G06K 7/10089; G06K 7/10019
(Continued)

(56) References Cited

U.S. PATENT DOCUMENTS

| 8,417,017 B1 * | 4/2013 | Beutel .................. G06Q 20/042 340/5.86 |
| 2004/0046642 A1 * | 3/2004 | Becker .................... G01V 15/00 340/10.32 |

(Continued)

FOREIGN PATENT DOCUMENTS

| JP | 11-282975 A | 10/1999 |
| JP | 2004-38574 A | 2/2004 |

(Continued)

OTHER PUBLICATIONS

International Search Report for PCT Application No. PCT/JP2014/002151, mailed on Jun. 3, 2014.

*Primary Examiner* — Carlos E Garcia

(57) ABSTRACT

An RFID reading device according to the present invention includes: response requesting unit (20) configured to output a response request signal to a wireless tag; response reception unit (24) configured to extract an ID of the wireless tag and detecting a signal collision of a response from the wireless tag, based on a response signal output from the wireless tag in response to the response request signal; reading result acquisition unit (25) configured to acquire a read tag number indicating the number of wireless tags from which the corresponding ID has been successfully read; collision occurrence status acquisition unit (26) configured to count the number of time slots in which the signal collision has occurred and calculating the number of collisions; and reading result complementing unit (27) config-
(Continued)

ured to estimate the number of readable wireless tags based on the read tag number and the number of collisions.

18 Claims, 8 Drawing Sheets

(52) U.S. Cl.
CPC ..... *G06K 7/10069* (2013.01); *G06K 7/10079* (2013.01); *G06K 7/10089* (2013.01)

(58) Field of Classification Search
USPC ............................................... 340/10.1–10.4
See application file for complete search history.

(56) References Cited

U.S. PATENT DOCUMENTS

| | | | | |
|---|---|---|---|---|
| 2005/0035849 A1* | 2/2005 | Yizhack | ............ | G06K 7/10019 340/5.92 |
| 2006/0232384 A1* | 10/2006 | Yang | ................. | G06K 7/10039 340/10.2 |
| 2007/0217455 A1* | 9/2007 | Haeusler | ............... | H04W 16/14 370/458 |
| 2007/0296590 A1* | 12/2007 | Diorio | .................. | G06K 7/0008 340/572.2 |
| 2007/0296603 A1* | 12/2007 | Diorio | .................. | G06K 7/0008 340/2.9 |
| 2008/0258864 A1* | 10/2008 | Hattori | ................. | G06K 7/0008 340/5.8 |
| 2010/0039237 A1* | 2/2010 | Radhakrishnan | .. | G06K 7/10029 340/10.4 |
| 2010/0090807 A1* | 4/2010 | Tsujimoto | .......... | G06K 7/10039 340/10.4 |
| 2015/0179284 A1* | 6/2015 | Alrod | .................... | G06F 11/076 714/704 |

FOREIGN PATENT DOCUMENTS

| | | |
|---|---|---|
| JP | 2005-528815 A | 9/2005 |
| JP | 2006-238381 A | 9/2006 |
| JP | 2007-221347 A | 8/2007 |
| JP | 2009-100951 A | 5/2009 |
| JP | 2010-086111 A | 4/2010 |
| JP | 2012-234389 A | 11/2012 |
| WO | 2006/104587 A2 | 10/2006 |

* cited by examiner

| IDs TO BE READ | READING STATUS | READING SUCCESS/FAILURE |
|---|---|---|
| 0x00000000FF00 | 2 | 1 |
| 0x00000000FF01 | 2 | 1 |
| 0x00000000FF02 | 2 | 0 |
| 0x00000000FF03 | 2 | 1 |
| 0x00000000FF04 | 1 | 1 |
| 0x00000000FF05 | 1 | 1 |
| 0x00000000FF06 | 0 | −1 |
| ⋮ | ⋮ | ⋮ |

READING STATUS
 0:NOT ATTEMPTED
 1:BEING ATTEMPTED
 2:COMPLETE

READING SUCCESS/FAILURE
 −1:UNDETERMINED
 0:FAILURE
 1:SUCCESS

RFID TAG READING DEVICE, RFID TAG READING PROGRAM, AND RFID TAG READING METHOD

This application is a National Stage Entry of PCT/JP2014/002151 filed on Apr. 16, 2014, which claims priority from Japanese Patent Application 2013-115940 filed on May 31, 2013, the contents of all of which are incorporated herein by reference, in their entirety.

TECHNICAL FIELD

The present invention relates to an RFID tag reading device, a non-transitory computer readable medium storing an RFID tag reading program, and an RFID tag reading method. In particular, the present invention relates to an RFID tag reading device, a non-transitory computer readable medium storing an RFID tag reading program, and an RFID tag reading method which read a plurality of RFID tags.

BACKGROUND ART

In recent years, many RFID tag systems to manage articles using wireless tags (for example, RFID tags) have been proposed. These RFID tag systems transmit response request signals to the wireless tags and receive response signals from the wireless tags through a single communication channel. Accordingly, the RFID tag systems have a problem that a signal collision occurs on the communication channel, which deteriorates the efficiency of ID reading.

In this regard, techniques for improving the efficiency of ID reading of RFID tags are disclosed in Patent Literature 1 to 4. In Patent Literature 1 and 2, a wireless tag reading device (for example, a reader) receives IDs transmitted from a plurality of wireless tags in one time slot which is randomly selected from among a plurality of time slots. Further, in Patent Literature 1 and 2, when the IDs are successfully received, an acknowledge invalidation process for suspending the transmission of signals from the wireless tags is carried out according to a signal output from the reader. According to Patent Literature 1 and 2, the ID reading process and the acknowledge invalidation process are repeatedly executed, thereby enhancing the efficiency of reading IDs from the plurality of wireless tags.

Patent Literature 3 and 4 disclose a technique in which only the wireless tags belonging to the groups which are sequentially set by a reader transmit IDs and the IDs are sequentially read from the wireless tags by limiting the groups as needed depending on the status of occurrence of a signal collision. Thus, in Patent Literature 3 and 4, the reading process is carried out by gradually reducing the probability of occurrence of a signal collision, thereby enhancing the efficiency of the ID reading process.

CITATION LIST

Patent Literature

[Patent Literature 1] Japanese Unexamined Patent Application Publication No. 2006-238381
[Patent Literature 2] Japanese Unexamined Patent Application Publication No. 2007-221347
[Patent Literature 3] Japanese Unexamined Patent Application Publication No. 2004-38574
[Patent Literature 4] Published Japanese Translation of PCT International Publication for Patent Application, No. 2005-528815

SUMMARY OF INVENTION

Technical Problem

However, in the techniques disclosed in Patent Literature 1 to 4, if a signal collision occurs, the reading process needs to be re-executed. This causes a problem that it takes much time to read IDs from a number of wireless tags.

The present invention has been made in view of the above-mentioned problem, and an object of the present invention is to effectively execute reading of IDs from a number of wireless tags.

Solution to Problem

A first exemplary aspect of the present invention is an RFID tag reading device including: a response requesting unit configured to output a response request signal to a wireless tag; a response reception unit configured to extract an ID of the wireless tag and detects a signal collision of a response from the wireless tag, based on a response signal output from the wireless tag in response to the response request signal; a reading result acquisition unit configured to acquire a read tag number indicating the number of wireless tags from which the corresponding ID has been successfully read; a collision occurrence status acquisition unit configured to count the number of time slots in which the signal collision has occurred, and calculates the number of collisions; and a reading result complementation unit configured to estimate the number of readable wireless tags based on the read tag number and the number of collisions.

A second exemplary aspect of the present invention is an RFID tag reading program executed by an operation unit in an RFID tag reading device, the RFID tag reading device comprising: the operation unit; a storage unit that stores a program; and an antenna that communicates with a wireless tag, the RFID tag reading program including: a response request signal generation step of generating a response request signal for the wireless tag, and providing the response request signal to the wireless tag via the antenna; a response reception step of extracting an ID of the wireless tag and detecting a signal collision of a response from the wireless tag, based on a response signal output from the wireless tag in response to the response request signal; a reading result acquisition step of acquiring a read tag number indicating the number of wireless tags from which the corresponding ID has been successfully read; a collision occurrence status acquisition step of counting the number of time slots in which the signal collision has occurred and calculating the number of collisions; and a reading result complementation step of estimating the number of readable wireless tags based on the read tag number and the number of collisions.

A third exemplary aspect of the present invention is an RFID tag reading method in an RFID tag reading device, the RFID tag reading device including: an antenna that communicates with a wireless tag; and an RFID reading processing unit that reads an RFID of the wireless tag based on a radio signal transmitted and received via the antenna, the RFID tag reading method including: a response request signal generation step of generating a response request signal for the wireless tag, and providing the response request signal to the wireless tag via the antenna; a response reception step of extracting an ID of the wireless tag and detecting a signal collision of a response from the wireless tag, based on a response signal output from the wireless tag in response to the response request signal; a reading result acquisition step of acquiring a read tag number indicating the number of wireless tags from which the corresponding ID has been successfully read; a collision occurrence status acquisition step of counting the number of time slots in which the signal collision has occurred and calculating the number of collisions; and a reading result complementation step of estimating the number of readable wireless tags based on the read tag number and the number of collisions.

Advantageous Effects of Invention

According to an RFID tag system, a non-transitory computer readable medium storing an RFID tag reading program, and an RFID tag reading method of the present invention, it is possible to enhance the efficiency of the process of reading IDs from a number of wireless tags.

DESCRIPTION OF EMBODIMENTS

First Exemplary Embodiment

Figure 1:
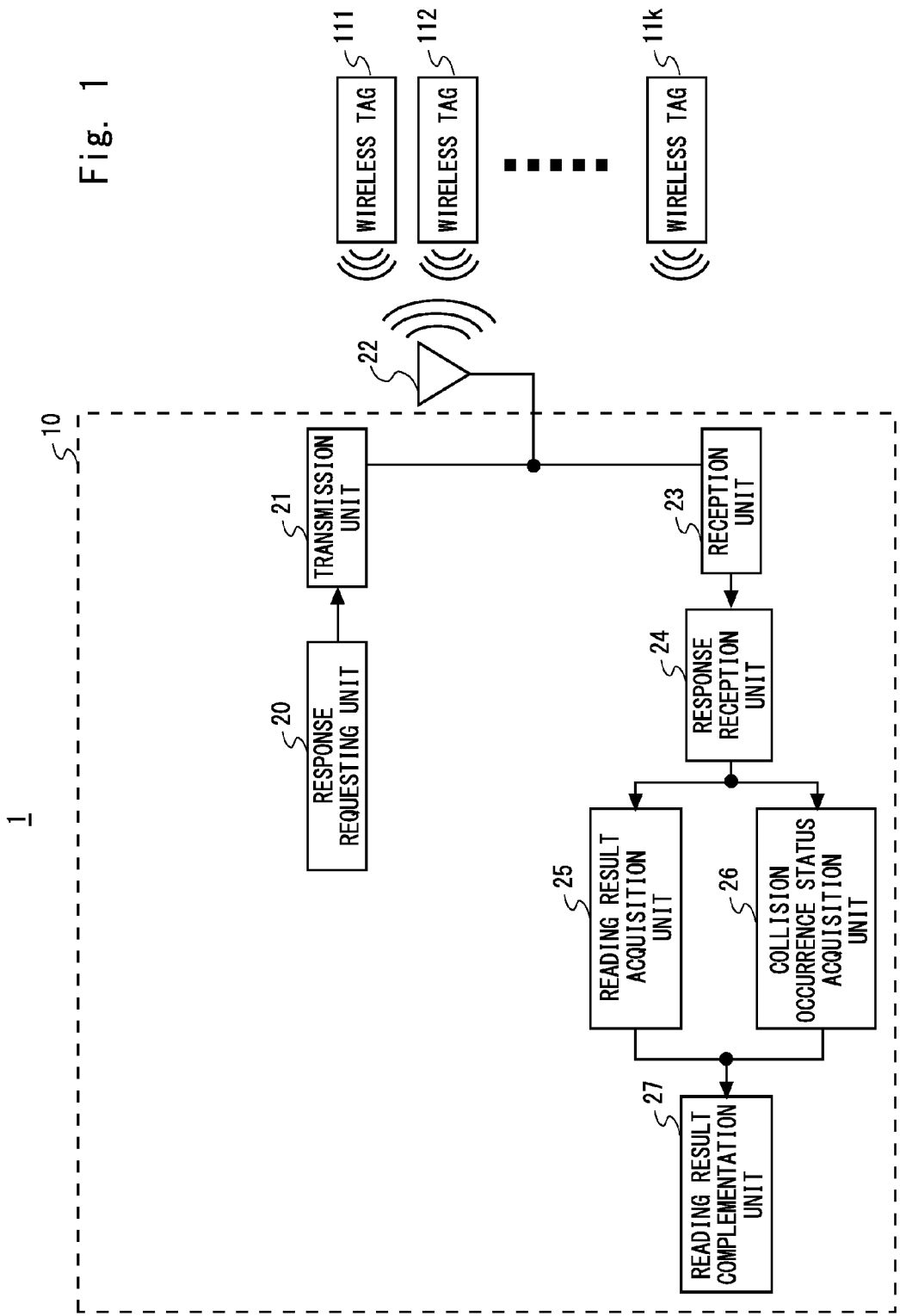
FIG. 1 is a block diagram schematically showing an RFID tag reading system according to a first exemplary embodiment.

Exemplary embodiments of the present invention will be described below with reference to the drawings. FIG. 1 is a block diagram schematically showing an RFID tag reading system 1 according to a first exemplary embodiment. The RFID tag reading system 1 is a system that reads, by radio communication, an identifier (hereinafter referred to as an ID) capable of individually identifying a plurality of wireless tags. In this case, each wireless tag transmits a signal (hereinafter referred to as a response) including the ID of the wireless tag to a wireless tag reading device 10 by using an antenna 22.

As shown in FIG. 1, the RFID tag reading system 1 according to the first exemplary embodiment includes the RFID tag reading device 10 and a plurality of wireless tags (FIG. 1 illustrates k wireless tags 111 to 11k). In this case, the RFID tag reading device 10 corresponds to a tag reader in a wireless tag system. Each of the wireless tags 111 to 11k transmits, to the RFID tag reading device 10, a signal (hereinafter referred to as a response signal) including the ID of the wireless tag according to a response request signal output from the RFID tag reading device 10.

In the example shown in FIG. 1, the RFID tag reading device 10 includes a response requesting unit 20, a transmission unit 21, the reader antenna 22, a reception unit 23, a response reception unit 24, a reading result acquisition unit 25, a collision occurrence status acquisition unit 26, and a reading result complementation unit 27. FIG. 1 illustrates only some of a number of processing blocks of the RFID tag reading device 10. In practice, the RFID tag reading device 10 includes more processing blocks. The processing blocks included in the RFID tag reading device 10 shown in FIG. 1 can be illustrated by omitting some of the processing blocks or by integrating the functions thereof.

Figure 2:
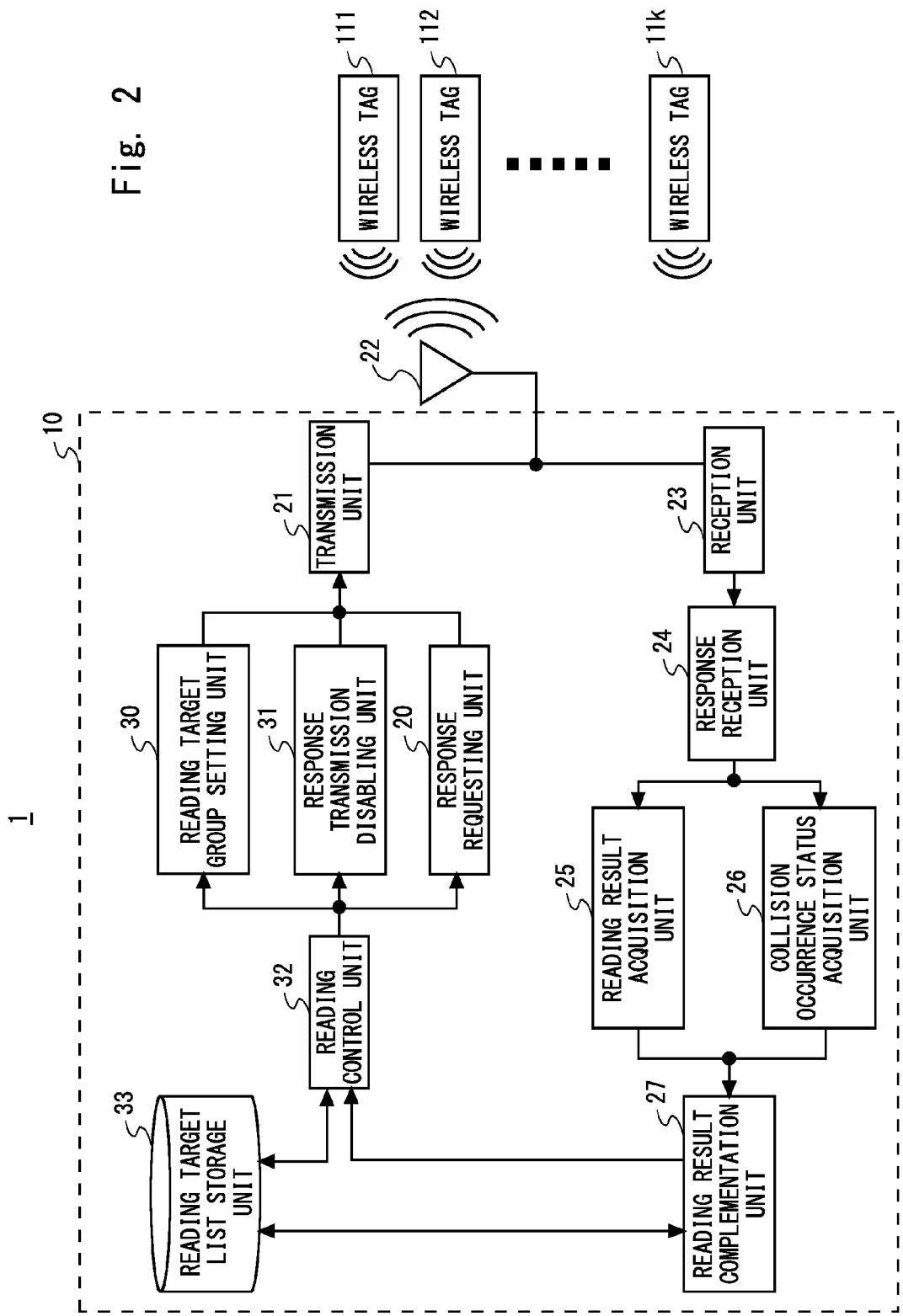
FIG. 2 is a detailed block diagram showing an RFID tag reading device according to the first exemplary embodiment.

FIG. 2 shows a detailed block diagram of the RFID tag reading system 1 including the RFID tag reading device 10 which includes processing blocks to fully obtain the effect of the RFID tag reading device 10 shown in FIG. 1.

The RFID tag reading device 10 shown in FIG. 2 includes a reading target group setting unit 30, a response transmission disabling unit 31, a reading control unit 32, and a reading target list storage unit 33, in addition to the RFID tag reading device 10 shown in FIG. 1. The functions and operations of the processing blocks of the RFID tag reading device 10 will be described in more detail below.

The reading target list storage unit 33 is a storage unit that stores a reading target list in which the IDs of wireless tags to be read are described. Specifically, the IDs of the wireless tags arranged in a readable range of the RFID reader 10 are described in the reading target list. This reading target list can be created by, for example, executing a reading process once in a state where all the wireless tags arranged in the readable range of the RFID reader 10 can be reliably read. The reading target list may be created by inputting the IDs of the wireless tags to be read in advance.

The reading control unit 32 sets a reading target group including at least one ID from the reading target list. Further, the reading control unit 32 writes, into the reading target list, information indicating that the reading process for the IDs included in the reading target group is being attempted. Furthermore, the reading control unit 32 controls the reading target group setting unit 30, the response transmission disabling unit 31, and the response requesting unit 20 according to the number of wireless tags to be read that are described in the reading target list and the number of readable wireless tags analyzed by the reading result complementation unit 27.

Note that various methods can be employed to set the reading target group in the reading control unit 32. In one example, a number of IDs included in the reading target list are equally divided and the divided IDs are grouped. In another example, IDs within a predetermined range are classified as one group by using the values of the IDs. In a still further example, the group is set using a group number predetermined between the RFID tag reading device 10 and the wireless tags 111 to 11k.

Further, the reading control unit 32 writes, into the reading target list, values indicating the success or failure of the wireless tag ID reading process based on the IDs included in the reading target list and the result of the process for complementation of reading results by the reading result complementation unit 27 as described later. The result writing process of the reading control unit 32 will be described in detail later.

The reading target group setting unit 30 outputs a group setting signal to enable the wireless tag corresponding to the ID included in the reading target group set by the reading control unit 32. This group setting signal is provided to the wireless tags 111 to 11k through the transmission unit 21 and the reader antenna 22.

Based on the control from the reading control unit 32, the response transmission disabling unit 31 outputs a disable signal, which interrupts the output of the response signal corresponding to the response request signal, to the wireless tag corresponding to the ID that is determined to have been successfully read by the reading result acquisition unit 25. This disable signal is provided to the wireless tags 111 to 11k through the transmission unit 21 and the reader antenna 22.

The response requesting unit 20 outputs the response request signal to the wireless tags 111 to 11k based on the control from the reading control unit 32. This response request signal is provided to the wireless tags 111 to 11k through the transmission unit 21 and the reader antenna 22.

The transmission unit 21 performs a modulation process on signals output from the reading target group setting unit 30, the response transmission disabling unit 31, and the response requesting unit 20, amplifies the processed signals, and outputs the amplified signals from the reader antenna 22. The reader antenna 22 is used for transmission and reception of radio signals.

The reception unit 23 performs a demodulation process on the response signal from the wireless tag received through the reader antenna 22, and outputs the response signal to a subsequent-stage circuit.

The response reception unit 24 extracts the ID of the wireless tag and detects a signal collision of a response from the wireless tag, based on the response signal that is output from the wireless tag and received from the reception unit 23. More specifically, when a signal collision of the response signal does not occur, the response reception unit 24 extracts the ID from the response signal. On the other hand, when a signal collision of the response signal occurs, the response reception unit 24 cannot extract the ID of the wireless tag, and outputs, to the collision occurrence status acquisition unit 26, a signal indicating that the signal collision has occurred. The response reception unit 24 performs the extraction of an ID and the detection of a signal collision in each time slot.

Upon receiving the group setting signal, the wireless tags 111 to 11k are enabled to output the response signal corresponding to the response request signal. Upon receiving the disable signal, the wireless tags 111 to 11k are disabled, so that the wireless tags 111 to 11k become unresponsive to the response request signal. The wireless tags 111 to 11k randomly select one time slot from a plurality of time slots set in a predetermined period, and output the response signal in the selected time slot. At this time, when a plurality of wireless tags select the same time slot and output the response signal in the same time slot, a signal collision of the response signal occurs. The wireless tags 111 to 11k may be configured to output the response signal using one predetermined time slot. Note that the set values, such as, the number of time slots used by the wireless tags 111 to 11k, the length of each time slot, and the period of time from the reception of the response request signal to the start of a time slot, are preferably set in advance. There are various methods for setting the values. Examples of the methods include a method in which a common value is set in advance to the wireless tags 111 to 11k and the RFID tag reading device 10, and a method in which a common value is set by performing communication between the RFID tag reading device 10 and the wireless tags 111 to 11k.

The reading result acquisition unit 25 acquires a read tag number indicating the number of wireless tags from which the corresponding ID has been successfully read. Further, the reading result acquisition unit 25 creates a reading success list including the IDs of the wireless tags from which the corresponding ID has been successfully read. This created reading list may be held in the reading result acquisition unit 25, or may be output to an external device which is not shown.

The collision occurrence status acquisition unit 26 counts the number of time slots in which a signal collision has occurred, and calculates the number of collisions.

The reading result complementation unit 27 estimates the number of readable wireless tags based on the read tag number, which indicates the number of wireless tags from which the corresponding ID has been acquired by the reading result acquisition unit 25, and the number of collisions calculated by the collision occurrence status acquisition unit 26. More specifically, assuming that the read tag number is m and the number of collisions is n, the reading result complementation unit 27 estimates that the number of readable wireless tags is equal to or greater than $m+2\times n$.

When $t \leq m+2\times n$ is satisfied, assuming that the number of wireless tags for which a reading process is being attempted is t, the reading control unit 32 recognizes that reading of all the wireless tags for which the reading process is being attempted has been completed, the wireless tags being selected from the wireless tags included in the reading target list. When the reading control unit 32 recognizes that reading of all the wireless tags for which the reading process is being attempted has been completed, the reading control unit 32 switches a wireless tag group for which the reading process is attempted.

When $t > m+2\times n$ is satisfied, assuming that the number of wireless tags for which the reading process is being attempted is t and the number of collisions is n, the reading control unit 32 records, in the reading target list, only the ID that has been successfully read in the IDs included in the reading target list, as a reading success condition. The reading control unit 32 overwrites a piece of information corresponding to the successfully read ID among the pieces of information included in the reading target list with the reading success condition.

Figures 3, 4:
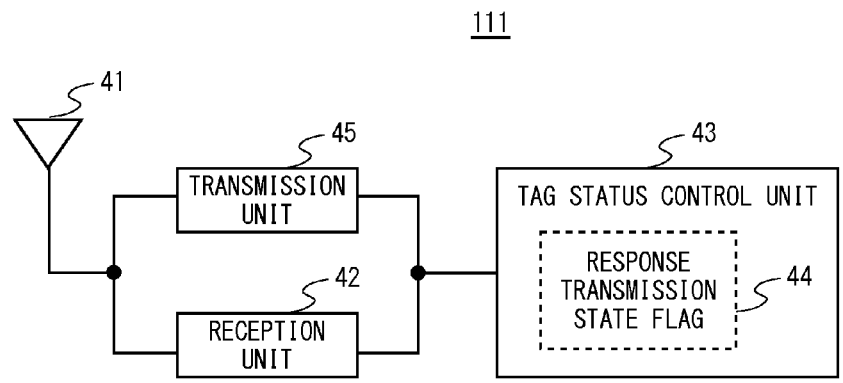
FIG. 3 is a detailed block diagram showing a wireless tag according to the first exemplary embodiment.
FIG. 4 is a table for explaining an example of a reading target list according to the first exemplary embodiment.

The wireless tags 111 to 11k will now be described in detail. Since the wireless tags 111 to 11k have the same circuit configuration, the wireless tag 111 to 11k will be described by taking the wireless tag 111 as an example. FIG. 3 is a block diagram showing the wireless tag 111 according to the first exemplary embodiment. As shown in FIG. 3, the wireless tag 111 includes a tag antenna 41, a reception unit 42, a tag status control unit 43, and a transmission unit 45.

The tag antenna 41 transmits a radio signal to the reader antenna 22 and receives a radio signal therefrom. The reception unit 42 performs a demodulation process on the signal received through the tag antenna 41, and transmits the demodulated signal to the tag status control unit 43.

When the received signal is identified as the response request signal for the wireless tag, the tag status control unit 43 outputs a response signal in a randomly selected time slot. This response signal is modulated by the reception unit 42 and is output from the tag antenna 41.

The tag status control unit 43 includes a response transmission status flag register 44. When the received signal is identified as the group setting signal for the wireless tag, the tag status control unit 43 enables a response transmission status flag and outputs a response signal in response to the response request signal. On the other hand, when the received signal is identified as the disable signal for the wireless tag, the tag status control unit 43 disables the response transmission status flag, so that the wireless tag becomes unresponsive to the response request signal.

Next, the reading target list stored in the reading target list storage unit 33 shown in FIG. 2 will be described in detail. FIG. 4 shows a table for explaining an example of the reading target list according to the first exemplary embodiment.

As shown in FIG. 4, IDs (IDs to be read shown in FIG. 4) of wireless tags to be read are listed in the reading target list. In the reading target list, a reading status value indicating the reading status corresponding to the ID to be read and a reading success/failure value indicating the success or failure of the reading process are described. In this case, the reading status value takes three different values, i.e., a value (for example, 0) indicating that the reading process has not been attempted, a value (for example, 1) indicating that the reading process is being attempted, and a value (for example, 2) indicating that the reading process has been completed. The reading success/failure value takes three different values, i.e., a value (for example, −1) indicating an indeterminate state in which the success or failure of the reading process has not been determined yet, a value (for example, 0) indicating that the reading process has failed, and a value (for example, 1) indicating that the reading process is successful.

Figure 5:
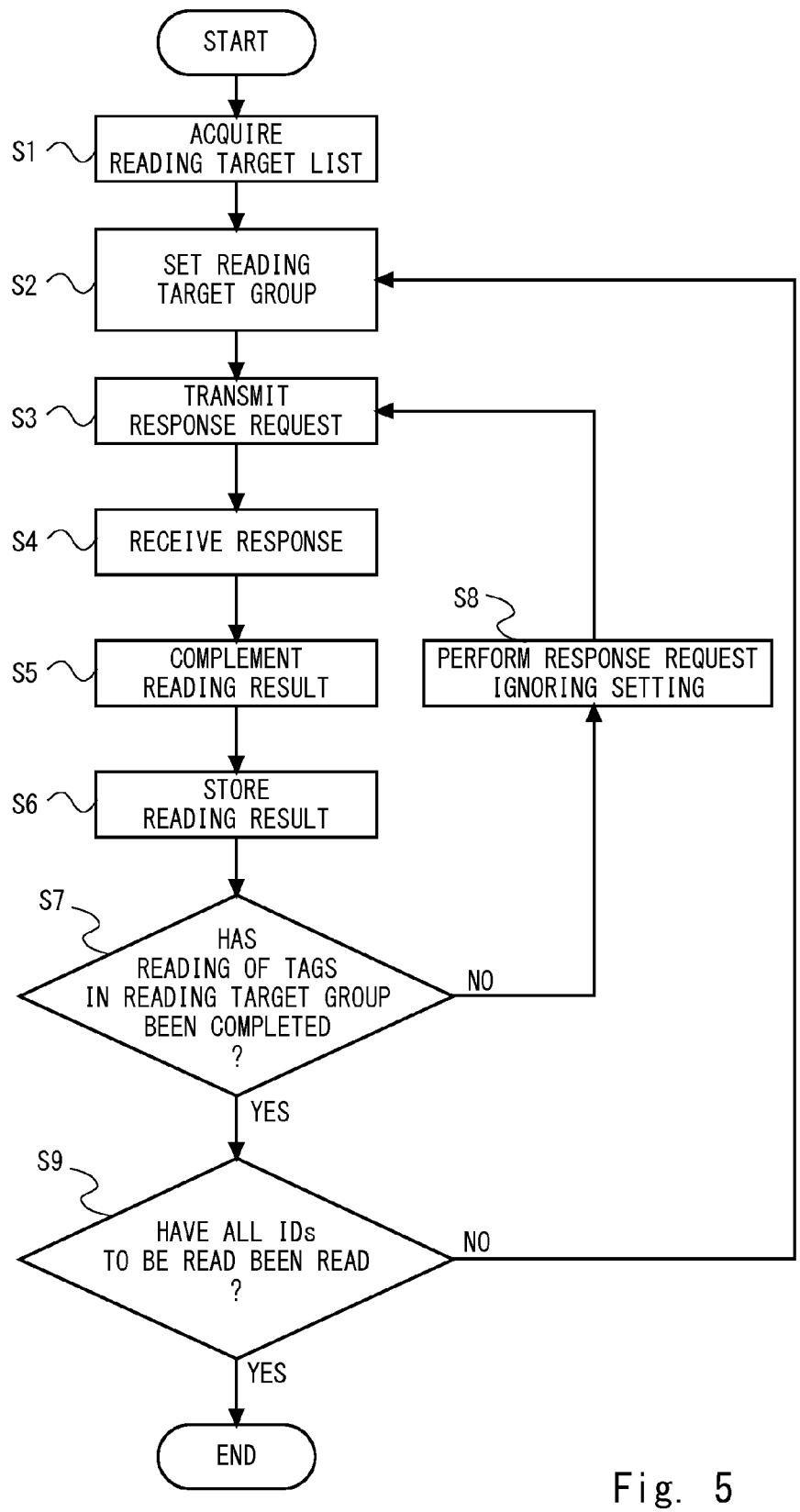
FIG. 5 is a flowchart showing an operation of the RFID tag reading device according to the first exemplary embodiment.

Next, the operation of the RFID tag reading device 10 according to the first exemplary embodiment will be described. FIG. 5 shows a flowchart for explaining the operation of the RFID tag reading device 10 according to the first exemplary embodiment.

As shown in FIG. 5, when the RFID tag reading device 10 according to the first exemplary embodiment starts the operation, the reading control unit 32 first acquires the reading target list from the reading target list storage unit 33 (step S1).

Next, the reading control unit 32 sets a plurality of reading target groups for the IDs included in the reading target list in accordance with a predetermined rule, and notifies the reading target group setting unit 30 of a reading target group selected from the plurality of set reading target groups (step S2). The reading target group setting unit 30 outputs the group setting signal to the wireless tag corresponding to the ID included in the set reading tag group, and enables the wireless tag requesting the response signal.

Next, the reading control unit 32 instructs the response requesting unit 20 to output the response request signal. The response requesting unit 20 outputs the response request signal based on the instruction from the reading control unit 32 (step S3). The response reception unit 24 receives the response signal output from the wireless tag in response to the response request signal (step S4).

Next, the RFID tag reading device 10 performs a reading result complementation process for estimating the number of wireless tags which have been successfully read (step S5). In the reading result complementation process of step S5, the reading result acquisition unit 25 first calculates the read tag number m indicating the number of wireless tags which have been successfully read. The collision occurrence status acquisition unit 26 calculates the collision number n indicating the number of time slots in which a signal collision of the response signal has occurred. The reading result complementation unit 27 estimates that the number of readable wireless tags is equal to or greater than (m+2×n), based on the read tag number m and the collision number n.

The reason that the number of readable wireless tags can be estimated to be equal to or greater than (m+2×n) based on the read tag number m and the collision number n will now be explained. First, a state in which a signal collision occurs in a predetermined time slot indicates that there are at least two wireless tags which have transmitted a response and have selected the time slot in which the signal collision has occurred. Each wireless tag selects any one of the time slots at the time of attempting the reading process, and transmits a response in the selected time slot. Thus, it can be estimated that the number of readable wireless tags is equal to or greater than the sum of the number of wireless tags which have been successfully read and two times the number of time slots in which the signal collision has occurred.

For example, in a case where a signal collision occurs during the reading process and a reading failure occurs (i.e., in a case where the number of time slots in which the signal collision has occurred is 1) when the number of time slots used for the reading process is 1 and the number t of IDs to be read (IDs for which the reading status value indicates that the reading process is being attempted) is 2 (i.e., when two wireless tags are to be read using one time slot), it can be determined that there are two readable wireless tags (0+2×1=2) which have transmitted a response, and thus the reading result can be complemented assuming that two IDs to be read have been read.

Next, the reading result complementation unit 27 notifies the reading control unit 32 of the reading result, and the reading control unit 32 records the reading result in the reading target list (step S6). More specifically, when the number t of IDs for which the reading status value in the reading target list indicates that the reading process is being attempted is equal to or less than a lower limit (m+2×n) of the estimated number of readable wireless tags (t≤m+2×n), the reading control unit 32 determines that all the IDs for which the reading status value in the reading target list indicates that the reading process is being attempted correspond to readable wireless tags, and outputs, as the reading result, all the IDs for which the reading status in the reading target list indicates that the reading process is being attempted. On the other hand, when the number t of IDs for which the reading status value in the reading target list indicates that the reading process is being attempted is greater than the lower limit (m+2×n) of the estimated number of readable wireless tags (t>m+2×n), the reading control unit 32 outputs, as the reading result, only the successfully read IDs obtained in the response reception unit 24.

Further, the reading control unit 32 overwrites the reading status value and the reading success/failure value in the reading target list according to the reading result. More specifically, the reading success/failure values in the reading target list that correspond to the IDs included in the reading result obtained by the reading result complementation unit 27 are changed to "success". When the number of time slots in which the signal collision has occurred that are obtained by the collision occurrence status acquisition unit 26 is 0, the reading target list storage unit 33 refers to the reading target list and changes, to "failure", the reading success/failure value corresponding to the ID for which the reading status value indicates "being attempted" and the reading success/failure value corresponding to the ID for which the reading success/failure value indicates "undetermined".

Next, in the RFID tag reading device 10, the reading control unit 32 determines whether reading of all the wireless tags included in the reading target group has been completed or not (step S7). More specifically, the reading control unit 32 refers to the reading target list, and in a state where there is no ID corresponding to the reading status value indicating "being attempted" or "undermined", the reading control unit 32 determines that reading of all the wireless tags included in the reading target group has been completed.

In this step S7, when the reading target group includes a wireless tag that has not been read (branch "NO" in step S7), the reading control unit 32 performs a response ignoring setting process for instructing the response transmission disabling unit 31 to output a response disable signal to the wireless tags which have been successfully read (step S8). Thus, the wireless tags that have received the response disable signal disable the response transmission status flag. Then the RFID tag reading device 10 executes the process from step S3 to step S7 again.

On the other hand, in step S7, when it is determined that reading of all the wireless tags included in the reading target group has been completed (branch "YES" in step S7), the reading control unit 32 overwrites the reading status value corresponding to the ID for which the reading status value indicates "being attempted" in the reading target list with "complete". Further, in step S7, when it is determined that reading of all the wireless tags included in the reading target group has been completed (branch "YES" in step S7), the reading control unit 32 determines whether reading of all the IDs registered in the reading target list has been completed or not (step S9). More specifically, in step S9, when there is no ID corresponding to the reading status value indicating "not attempted" in the reading target list, the reading control unit 32 determines that reading of all the wireless tags included in the reading target list has been completed.

In this step S9, when reading of all the IDs registered in the reading target list has not been completed (branch "NO" in step S9), the reading control unit 32 instructs the reading target group setting unit 30 to set the reading target group including IDs indicating that the reading process has not been completed, and the reading target group setting unit 30 executes the process of step S2 again. Further, in step S2, the reading control unit 32 overwrites, with "being attempted", the reading status values in the reading target list that correspond to the IDs included in the reading target group. On the other hand, in step S9, when reading of all the IDs registered in the reading target list has been completed (branch "YES" in step S9), the RFID tag reading device 10 terminates the reading process.

Figure 6:
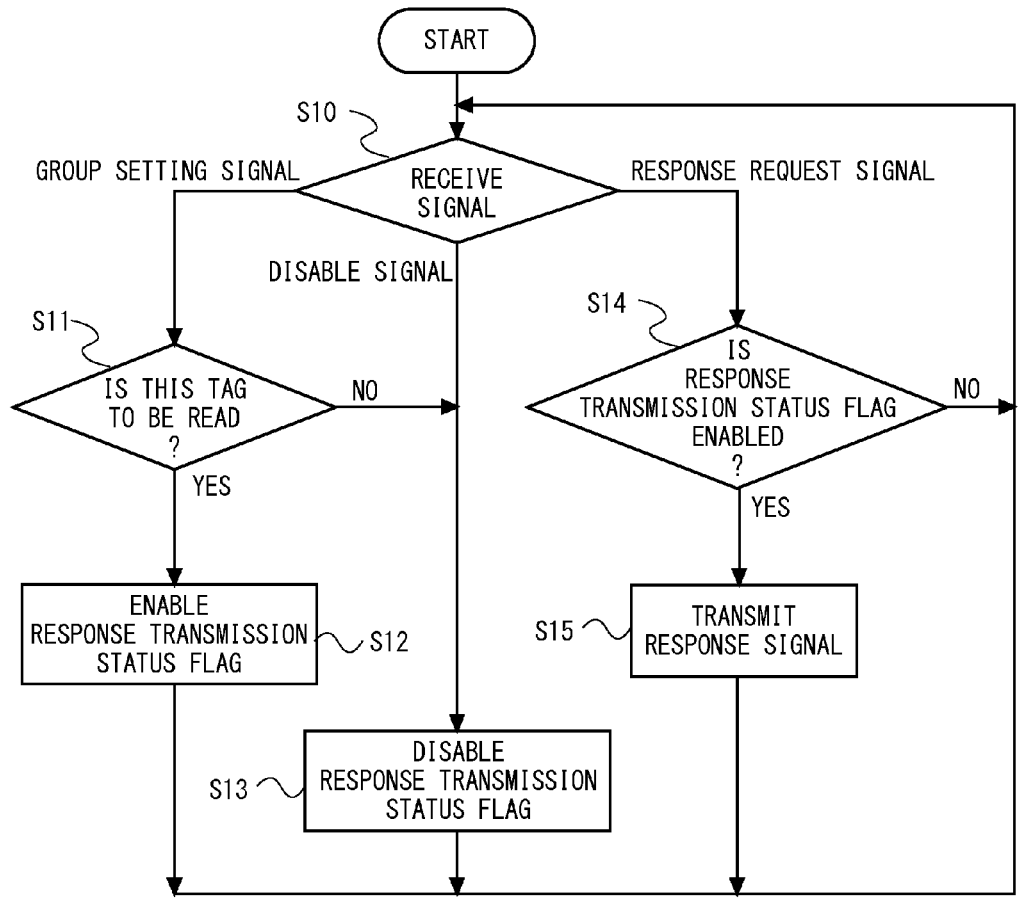
FIG. 6 is a flowchart showing an operation of the wireless tag according to the first exemplary embodiment.

Next, the operation of the wireless tag according to the first exemplary embodiment will be described. FIG. 6 shows a flowchart for explaining the operation of the wireless tag according to the first exemplary embodiment. As shown in FIG. 6, when the wireless tag according to the first exemplary embodiment receives a signal from the reader antenna 22, the wireless tag performs different processes depending on the type of the signal (step S10).

When the received signal is identified as the group setting signal, the wireless tag determines whether or not the reading target group specified by the group setting signal includes the wireless tag (step S11). When the wireless tag determines that the wireless tag is not included in the reading target group (branch "NO" in step S11), the wireless tag disables the response transmission status flag (step S13). On the other hand, when the wireless tag determines that the wireless tag is included in the reading target group (branch "YES" in step S11), the wireless tag enables the response transmission status flag (step S12). Then the wireless tag remains in a stand-by state until the next signal is received after the response transmission status flag is enabled or disabled.

When the received signal is identified as the disable signal, the wireless tag disables the response transmission status flag (step S13). Since the disable signal is transmitted to a specified wireless tag, only the specified wireless tag disables the response transmission status flag. Then the wireless tag remains in the stand-by state until the next signal is received after the response transmission status flag is disabled.

When the received signal is identified as the response request signal, the wireless tag determines whether the response transmission status flag is enabled or not (step S14). In this step S14, when the response transmission status flag is disabled (branch "NO" in step S14), the wireless tag remains in the stand-by state until the next signal is received. On the other hand, in step S14, when the response transmission status flag is enabled (branch "YES" in step S14), the wireless tag transmits the response signal (step S15). Then the wireless tag remains in the stand-by state until the next signal is received after the transmission signal is transmitted.

As described above, in the RFID tag reading device 10 according to the first exemplary embodiment, the number of readable wireless tags can be estimated based on the number m of wireless tags which have been successfully read and the number n of time slots in which the signal collision has occurred. Thus, the estimation of the number of readable wireless tags eliminates the need for the RFID tag reading device 10 according to the first exemplary embodiment to perform the reading process again on the wireless tags which are not successfully read due to the occurrence of a signal collision. Therefore, the RFID tag reading device 10 according to the first exemplary embodiment can enhance the efficiency of reading IDs, even if a signal collision occurs. In the case of reading IDs of four wireless tags, for example, when two IDs are successfully read and the IDs of the other two wireless tags are not successfully read due to a signal collision, it is necessary to perform the reading process again in the reading method of the related art. However, in the RFID tag reading device 10 according to the first exemplary embodiment, when the number of wireless tags which have been successfully read is 2 and the number of time slots in which a signal collision has occurred is 1, $2+2\times1=4$ holds. Accordingly, it can be estimated that four or more wireless tags can be read, and thus there is no need to perform the reading process again.

Further, in the RFID tag reading device 10 according to the first exemplary embodiment, the number of wireless tags to be read can be set as appropriate by setting the reading target group. This allows the RFID tag reading device 10 to limit the number of wireless tags that output a response signal in response to an output of the response request signal. Thus, by limiting the number of wireless tags that output the response signal in response to an output of the response request signal, the efficiency of reading IDs in the RFID tag reading system 1 can be further enhanced. For example, when the number of IDs included in one reading target group is 2 and the response signals of all wireless tags to be output are set in the same time slot, reading of all the IDs can be executed without the need to repeatedly perform the reading operation. Specifically, it can be recognized, based on one response request signal, that when a signal collision occurs, two wireless tags can be read; when any one of the wireless tags outputs the response signal, only one readable wireless tag can be read; and when neither of the wireless tags outputs the response signal, there is no readable wireless tag.

Furthermore, in the RFID tag reading device 10 according to the first exemplary embodiment, the wireless tags which have been successfully read can be disabled. With this configuration, the RFID tag reading device 10 according to the first exemplary embodiment can enhance the efficiency of reading IDs. Specifically, when the number of readable wireless tags that is estimated based on the number m of IDs which have been successfully read by the RFID tag reading device 10 and the number n of time slots in which a signal collision has occurred is smaller than the number t of wireless tags to be read, the reading process is re-executed after the successfully read wireless tags are disabled. As a result, even if the response signals from three or more wireless tags cause a signal collision and the wireless tags have not been successfully read in the previous reading operation, the probability of increasing the number of wireless tags that can be successfully read in the subsequent reading operation can be enhanced.

According to the RFID tag reading system 1 of the first exemplary embodiment, the efficiency of reading IDs can be enhanced especially in the system in which wireless tags to be read are known. In this regard, the RFID tag reading system 1 which can more effectively use the RFID tag reading device 10 will be described below.

Figure 7:
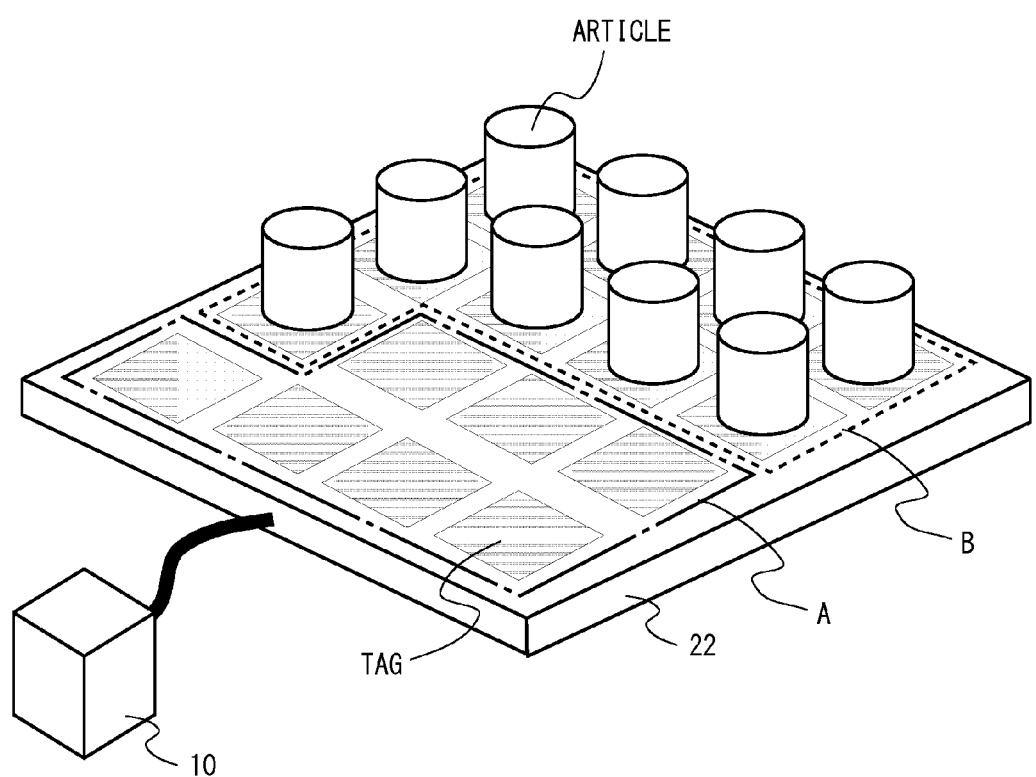
FIG. 7 is a schematic view of an RFID system showing an example of the use form of the RFID tag reading device according to the first exemplary embodiment.

FIG. 7 shows a schematic view of an RFID system showing an example of the use form of the RFID tag reading device according to the first exemplary embodiment. In the example shown in FIG. 7, an article management system is constructed using the RFID tag reading system 1. The RFID tag reading system 1 shown in FIG. 7 connects the RFID tag reading device 10 to the reader antenna 22, which is disposed in the form of a plate, with a cable. In the RFID tag reading system 1 shown in FIG. 7, wireless tags are placed over the upper surface of the reader antenna 22 and articles to be managed are arranged on the respective wireless tags.

In this case, the wireless tags each have a characteristic that the response signal output from the wireless tag in response to the response request signal output from the reader antenna 22 has a lower signal strength in a state where an article is placed on the wireless tag, than in a state where no article is placed on the wireless tag. In the example shown in FIG. 7, the response signals from the wireless tags arranged in an area B have a signal strength lower than that of the response signals from the wireless tags arranged in an area A. When the signal strength of the response signal is low, the RFID tag reading device 10 cannot recognize the response signal properly, which causes a reading failure.

In the RFID tag reading system 1 shown in FIG. 7, the wireless tags are arranged in a fixed manner on the reader antenna 22, regardless of whether or not there are articles on the wireless tags. Accordingly, the IDs of the wireless tags registered in the reading target list of the RFID tag reading device 10 can be specified in advance.

In the article management system as described above, the IDs of the wireless tags to be read are determined in advance, and readable wireless tags can be specified merely by estimating the number of readable wireless tags, without the need for specifying the IDs. In other words, when the RFID tag reading device 10 according to the first exemplary embodiment is applied to the article management system shown in FIG. 7, the number of ID reading processes can be reduced, so that the effect of enhancing the efficiency of reading the IDs can be obtained.

Second Exemplary Embodiment

Figure 8:
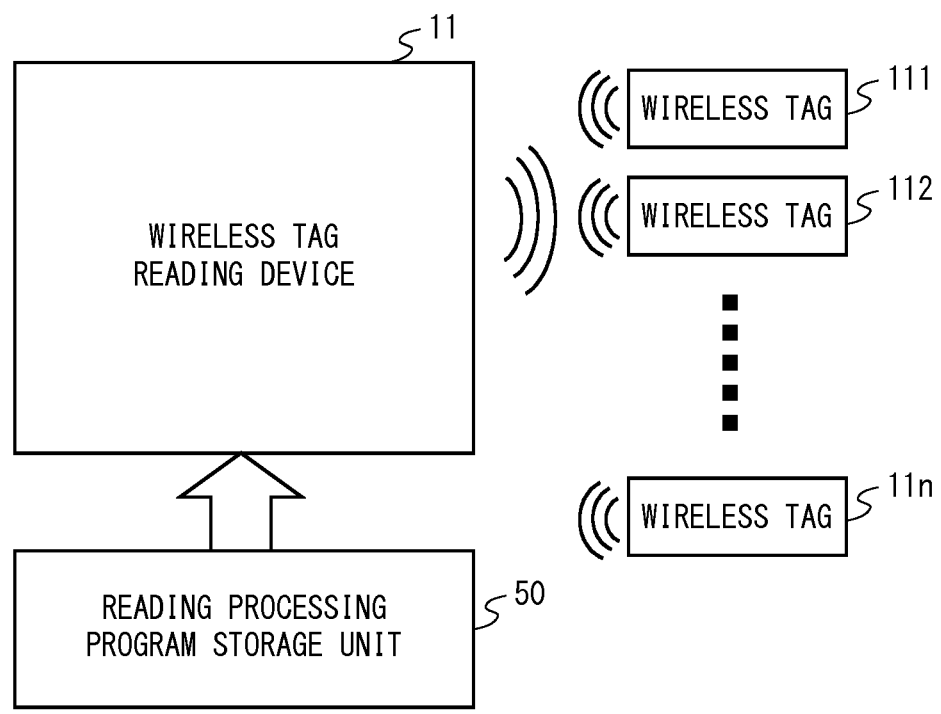
FIG. 8 is a block diagram showing an RFID tag reading system according to a second exemplary embodiment.

The first exemplary embodiment has illustrated an example in which the functions of the RFID tag reading device 10 are implemented by hardware. In a second exemplary embodiment, an example in which the functions of the RFID tag reading device 10 are implemented by software will be described. FIG. 8 shows a block diagram of an RFID tag reading system 2 according to the second exemplary embodiment. Note that components of the second exemplary embodiment which are identical to or implement the same function as the components of the first exemplary embodiment are denoted by the same reference numerals as those of the first exemplary embodiment.

As shown in FIG. 8, the RFID tag reading system 2 includes an RFID tag reading device 11 and wireless tags 11l to 11k. This RFID tag reading device 11 is, for example, an arithmetic unit, such as a computer. The RFID tag reading device 11 operates based on an RFID tag reading program from a reading processing program storage unit 50, which is provided in a storage unit that is provided outside or inside the RFID tag reading device, thereby implementing the same functions as the RFID tag reading device 10.

Figure 9:
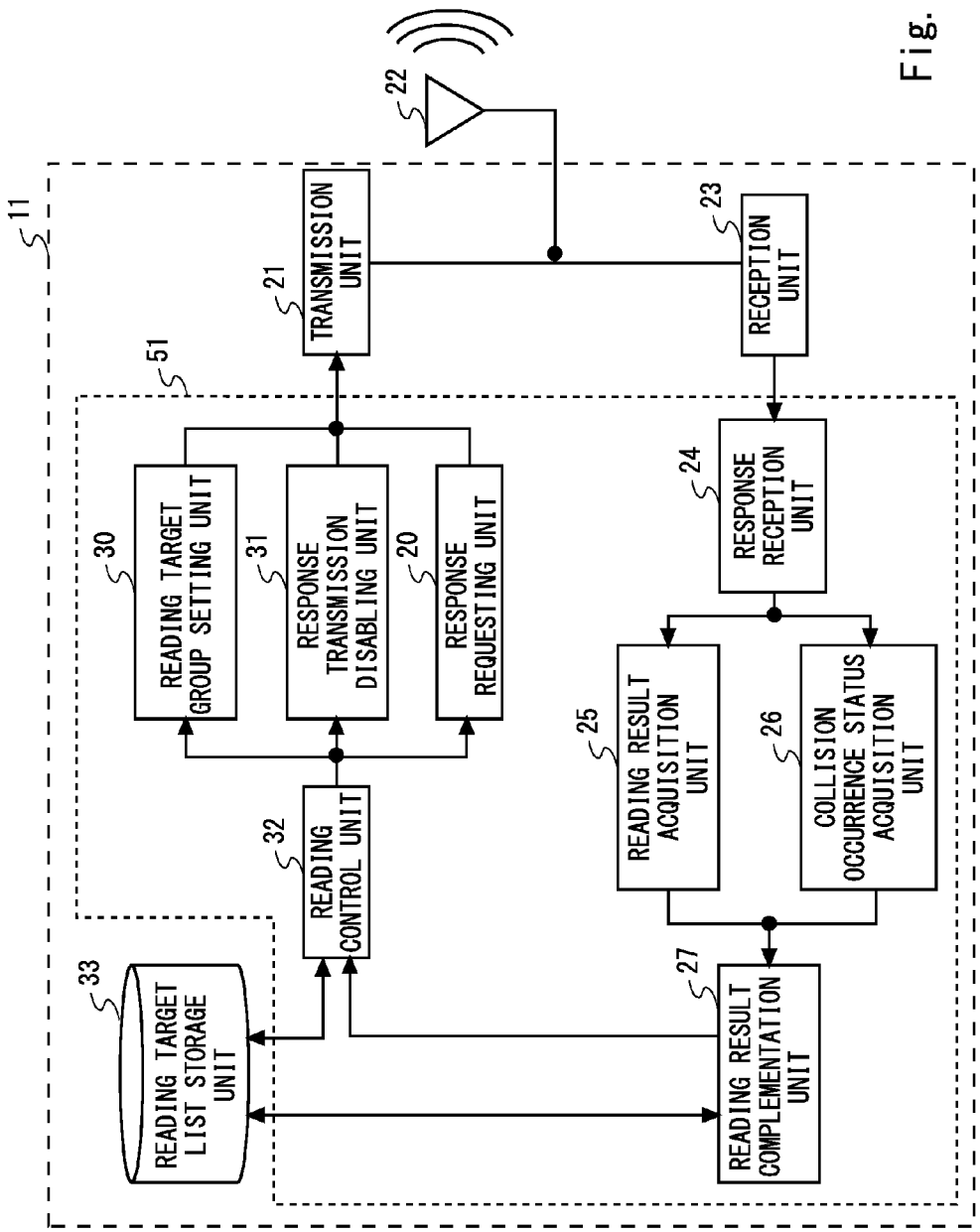
FIG. 9 is a detailed block diagram showing an RFID tag reading device according to the second exemplary embodiment.

The RFID tag reading device 11 will now be described in further detail. FIG. 9 shows a detailed block diagram of the RFID tag reading device 11 according to the second exemplary embodiment. As shown in FIG. 9, the RFID tag reading device 11 includes the reading target list storage unit 33, the transmission unit 21, the reader antenna 22, the reception unit 23, and an operation unit 51. The operation unit 51 implements the functions of the reading target group setting unit 30, the response transmission disabling unit 31, the reading control unit 32, the response requesting unit 20, the response reception unit 24, the reading result acquisition unit 25, the collision occurrence status acquisition unit 26, and the reading result complementation unit 27 by the RFID reading program that is stored in the reading target list storage unit 33 or another storage device.

More specifically, the operation unit 51 implements a response request signal generation step, a response reception step, a reading result acquisition step, a collision occurrence status acquisition step, a reading result complementation step, a reading control step, a reading target group setting step, and a response signal disabling step, by executing the RFID reading program.

The response request signal generation step is a function implemented by the response requesting unit 20. Specifically, in the response request signal generation step, the response request signal is generated for the wireless tags 11l to 11k, and the generated response request signal is provided to the wireless tags 11l to 11k via the antenna 22.

The response reception step is a function implemented by the response reception unit 24. Specifically, in the response reception step, the extraction of the ID of a wireless tag and the detection of a signal collision of the response from the wireless tag are performed based on the response signal output from the wireless tags 11l to 11k in response to the response request signal.

The reading result acquisition step is a function implemented by the reading result acquisition unit 25. Specifically, in the reading result acquisition step, the read tag number indicating the number of wireless tags from which the corresponding ID has been successfully read is acquired. Further, in the reading result acquisition step, the reading success list including the IDs of wireless tags from which the corresponding ID has been successfully read is created.

The collision occurrence status acquisition step is a function implemented by the collision occurrence status acquisition unit 26. In the collision occurrence status acquisition step, the number of time slots in which a signal collision has occurred is counted and the number of collisions is calculated.

The reading result complementation step is a function implemented by the reading result complementation unit 27. In the reading result complementation step, the number of readable wireless tags is estimated based on the read tag number and the number of collisions. More specifically, in the reading result complementation step, assuming that the read tag number is m and the number of collisions is n, the number of readable wireless tags is estimated to be equal to or greater than m+2×n.

The reading control step is a function implemented by the reading control unit 32. Specifically, in the reading control step, a reading target group including at least one ID from the reading target list is set. Further, in the reading control step, information indicating that a reading process is being attempted for the ID included in the reading target group is written into the reading target list. Furthermore, in the reading control step, the execution of the reading target group setting step, the response transmission disabling step, and the response requesting step is controlled according to the number of wireless tags to be read which are described in the reading target list and the number of readable wireless tags analyzed in the reading result complementation step.

In the reading control step, when t≤m+2×n is satisfied, assuming that the number of wireless tags for which the reading process is being attempted is t, it is recognized that reading of all the wireless tags for which the reading process is being attempted has been completed, the wireless tags being selected from the wireless tags included in the reading target list. Further, in the reading result complementation step, when it is recognized that reading of all the wireless tags for which the reading process is being attempted has been completed, an instruction to switch the wireless tag group for which the reading process is attempted is output.

Furthermore, in the reading control step, when t>m+2×n is satisfied, assuming that the number of wireless tags for which the reading process is being attempted is t, only the ID that has been successfully read in the IDs included in the reading target list is recorded as the reading success condition. Note that in the reading control step, a piece of information corresponding to the successfully read ID among the pieces of information included in the reading target list is overwritten with the reading success condition.

In the reading target group setting step, the group setting signal to enable the wireless tag corresponding to the ID included in the reading tag group set in the reading control step is output.

In the response signal disabling step, the disable signal to interrupt the output of the response signal corresponding to the response request signal is output to the wireless tag corresponding to the ID which is determined to have been successfully read in the reading result acquisition step, based on the process in the reading control step.

As described above, the RFID tag reading device 11 according to the second exemplary embodiment implements by software the same functions as those which the RFID tag reading device 10 implements by hardware. In this manner, the system is constructed using software and an arithmetic unit such as a computer, which eliminates the need to prepare dedicated hardware. This provides an effect that the system can be easily introduced.

The invention made by the present inventor has been described above based on exemplary embodiments. However, the present invention is not limited to the exemplary embodiments described above, and can be modified in various ways without departing from the scope of the invention, as a matter of course.

For example, in the second exemplary embodiment, the operation unit 51 executes the RFID reading program to thereby implement the functions of the reading target group setting unit 30, the response transmission disabling unit 31, the reading control unit 32, the response requesting unit 20, the response reception unit 24, the reading result acquisition unit 25, the collision occurrence status acquisition unit 26, and the reading result complementation unit 27. However, the reading target group setting unit 30, the response transmission disabling unit 31, the reading control unit 32, and the response reception unit 24 can be implemented as hardware blocks separately from the operation unit 51, and these hardware blocks can be controlled from the operation unit 51. That is, in the present invention, combinations of software and hardware to configure the RFID reader can be arbitrarily selected.

Although the present invention has been described as a hardware configuration in the above exemplary embodiments, the present invention is not limited to this configuration. The present invention can also implement any process by causing a CPU (Central Processing Unit) to execute a computer program. The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a wireless communication line.

This application is based upon and claims the benefit of priority from Japanese patent application No. 2013-115940, filed on May 31, 2013, the disclosure of which is incorporated herein in its entirety by reference.

REFERENCE SIGNS LIST 1, 2 RFID TAG READING SYSTEM
10, 11 RFID TAG READING DEVICE
20 RESPONSE REQUESTING UNIT
21 TRANSMISSION UNIT
22 READER ANTENNA
23 RECEPTION UNIT
24 RESPONSE RECEPTION UNIT
25 READING RESULT ACQUISITION UNIT
26 COLLISION OCCURRENCE STATUS ACQUISITION UNIT
27 READING RESULT COMPLEMENTATION UNIT
30 READING TARGET GROUP SETTING UNIT
31 RESPONSE TRANSMISSION DISABLING UNIT

32 READING CONTROL UNIT
33 READING TARGET LIST STORAGE UNIT
41 TAG ANTENNA
42 RECEPTION UNIT
43 TAG STATUS CONTROL UNIT
44 RESPONSE TRANSMISSION STATUS FLAG REGISTER
45 TRANSMISSION UNIT
50 READING PROCESSING PROGRAM STORAGE UNIT
51 OPERATION UNIT
111 to 11k WIRELESS TAG

What is claimed is:

1. An RFID tag reading device comprising:
response requesting unit configured to output a response request signal to a wireless tag;
response reception unit configured to extract an ID of the wireless tag and detecting a signal collision of a response from the wireless tag, based on a response signal output from the wireless tag in response to the response request signal;
reading result acquisition unit configured to acquire a read tag number indicating the number of wireless tags from which the corresponding ID has been successfully read;
collision occurrence status acquisition unit configured to count the number of time slots in which the signal collision has occurred, and for calculating the number of collisions; and
reading result complementing unit configured to estimate the number of readable wireless tags based on the read tag number and the number of collisions;
wherein the wireless tag outputs the response signal having a higher signal strength in a state where no article is placed at a location corresponding to the wireless tag, than in a state where an article is placed at the location corresponding to the wireless tag.

2. The RFID tag reading device according to claim 1, wherein the read tag number is m and the number of collisions is n, the reading result complementing unit estimates that the number of readable wireless tags is equal to or greater than $m+2\times n$.

3. The RFID tag reading device according to claim 1, further comprising:
reading target list storage unit configured to store a reading target list in which IDs of wireless tags to be read are described;
reading control unit configured to set a reading target group including at least one ID from the reading target list; and
reading target group setting unit configured to output a group setting signal to enable the wireless tag corresponding to the ID included in the reading target group set by the reading control means.

4. The RFID tag reading device according to claim 3, wherein when $t \leq m+2\times n$ is satisfied, the read tag number is m, the number of collisions is n and the number of the wireless tags for which a reading process is being attempted is t, the reading control unit recognizes that reading of all the wireless tags for which the reading process is being attempted has been completed, the wireless tags being selected from the wireless tags included in the reading target list.

5. The RFID tag reading device according to claim 3, wherein when $t > m+2\times n$ is satisfied, the read tag number is m, the number of collisions is n and the number of wireless tags for which a reading process is being attempted is t, the reading control unit records, as a reading success condition, only the ID that has been successfully read in the IDs included in the reading target list.

6. The RFID tag reading device according to claim 3, wherein
the reading target group setting unit sets one reading target group using two IDs, and
the wireless tag is set so as to output the response signal in a time slot.

7. A non-transitory computer readable medium storing a program executed by operation means in an RFID tag reading device, the RFID tag reading device comprising: the operation means; storage means for storing a program; and an antenna that communicates with a wireless tag, the program comprising:
a response request signal generation step of generating a response request signal for the wireless tag, and providing the response request signal to the wireless tag via the antenna;
a response reception step of extracting an ID of the wireless tag and detecting a signal collision of a response from the wireless tag, based on a response signal output from the wireless tag in response to the response request signal;
a reading result acquisition step of acquiring a read tag number indicating the number of wireless tags from which the corresponding ID has been successfully read;
a collision occurrence status acquisition step of counting the number of time slots in which the signal collision has occurred and calculating the number of collisions; and
a reading result complementation step of estimating the number of readable wireless tags based on the read tag number and the number of collisions;
wherein the wireless tag outputs the response signal having a higher signal strength in a state where no article is placed at a location corresponding to the wireless tag, than in a state where an article is placed at the location corresponding to the wireless tag.

8. The non-transitory computer readable medium storing a program according to claim 7, wherein in the reading result complementation step, the read tag number is m and the number of collisions is n, the number of readable wireless tags is estimated to be equal to or greater than $m+2\times n$.

9. The non-transitory computer readable medium storing a program according to claim 7, wherein
the storage means includes reading target list storage means for storing a reading target list in which IDs of wireless tags to be read are described, and
the program includes:
a reading control step of setting a reading target group including at least one ID from the reading target list; and
a reading target group setting step of outputting a group setting signal to enable the wireless tag corresponding to the ID included in the reading target group set in the reading control step.

10. The non-transitory computer readable medium storing a program according to claim 9, wherein in the reading control step, when $t \leq m+2\times n$ is satisfied, the read tag number is m, the number of collisions is n and the number of wireless tags for which a reading process is being attempted is t, it is recognized that reading of all the wireless tags for which the reading process is being attempted has been completed, the wireless tags being selected from the wireless tags included in the reading target list.

11. The non-transitory computer readable medium storing a program according to claim 9, wherein in the reading control step, when t>m+2×n is satisfied, the read tag number is m, the number of collisions is n and the number of wireless tags for which a reading process is being attempted is t, only the ID that has been successfully read in the IDs included in the reading target list is recorded as a reading success condition.

12. The non-transitory computer readable medium storing a program according to claim 9, wherein
in the reading control step, one reading target group is set using two IDs, and
the wireless tag is set so as to output the response signal in a time slot.

13. An RFID tag reading method in an RFID tag reading device, the RFID tag reading device comprising: an antenna that communicates with a wireless tag; and RFID reading processing means for reading an RFID of the wireless tag based on a radio signal transmitted and received via the antenna, the RFID tag reading method comprising:
generating a response request signal for the wireless tag, and providing the response request signal to the wireless tag via the antenna;
extracting an ID of the wireless tag and detecting a signal collision of a response from the wireless tag, based on a response signal output from the wireless tag in response to the response request signal;
acquiring a read tag number indicating the number of wireless tags from which the corresponding ID has been successfully read;
counting the number of time slots in which the signal collision has occurred and calculating the number of collisions; and
estimating the number of readable wireless tags based on the read tag number and the number of collisions;
wherein the wireless tag outputs the response signal having a higher signal strength in a state where no article is placed at a location corresponding to the wireless tag, than in a state where an article is placed at the location corresponding to the wireless tag.

14. The RFID tag reading method according to claim 13, wherein in the process of estimating the number of readable wireless tags, the read tag number is m and the number of collisions is n, the number of readable wireless tags is estimated to be equal to or greater than m+2×n.

15. The RFID tag reading method according to claim 13, wherein
the RFID reading processing means includes reading target list storage means for storing a reading target list in which IDs of wireless tags to be read are described, and
in the RFID reading processing means,
a reading target group including at least one ID from the reading target list is set, and
a group setting signal for enabling the wireless tag corresponding to the ID included in the set reading target group is output.

16. The RFID tag reading method according to claim 15, wherein in the process of acquiring the read tag number indicating the number of wireless tags from which the corresponding ID has been successfully read, the read tag number is m, the number of collisions is n and the number of wireless tags for which a reading process is being attempted is t, it is recognized that reading of all the wireless tags for which the reading process is being attempted has been completed, the wireless tags being selected from the wireless tags included in the reading target list.

17. The RFID tag reading method according to claim 15, wherein in the process of acquiring the read tag number indicating the number of wireless tags from which the corresponding ID has been successfully read, when t>m+2×n is satisfied, the read tag number is m, the number of collisions is n and the number of wireless tags for which a reading process is being attempted is t, only the ID that has been successfully read in the IDs included in the reading target list is recorded as a reading success condition.

18. The RFID tag reading method according to claim 15, wherein
in the process of setting the reading target group, one reading target group is set using two IDs, and
the wireless tag is set so as to output the response signal in a time slot.

* * * * *